(12) United States Patent
Tsukamoto

(10) Patent No.: US 7,887,124 B2
(45) Date of Patent: Feb. 15, 2011

(54) CAB STRUCTURE FOR CONSTRUCTION MACHINE

(75) Inventor: Daisuke Tsukamoto, Hirakata (JP)

(73) Assignee: Komatsu Ltd., Tokyo (JP)

( * ) Notice: Subject to any disclaimer, the term of this patent is extended or adjusted under 35 U.S.C. 154(b) by 79 days.

(21) Appl. No.: 11/995,843

(22) PCT Filed: Jul. 13, 2006

(86) PCT No.: PCT/JP2006/313931

§ 371 (c)(1),
(2), (4) Date: Jan. 16, 2008

(87) PCT Pub. No.: WO2007/010808

PCT Pub. Date: Jan. 25, 2007

(65) Prior Publication Data

US 2009/0115223 A1    May 7, 2009

(30) Foreign Application Priority Data

Jul. 19, 2005    (JP)    ............... 2005-208251

(51) Int. Cl.
*B60N 99/00* (2006.01)

(52) U.S. Cl. ............ 296/190.08; 296/190.01; 296/190.03

(58) Field of Classification Search ............ 296/190.01, 296/190.03, 190.08, 187.01, 193.01, 193.06, 296/193.12, 203.01, 205, 29, 30
See application file for complete search history.

(56) References Cited

U.S. PATENT DOCUMENTS

| | | | | |
|---|---|---|---|---|
| 4,772,065 A | * | 9/1988 | Nakata et al. ............... | 264/279 |
| 5,820,199 A | * | 10/1998 | Camplin et al. ............. | 296/102 |
| 5,944,440 A | * | 8/1999 | Kleinschmit et al. ........ | 403/271 |
| 6,189,955 B1 | * | 2/2001 | Fryk et al. ............. | 296/190.08 |
| 6,568,746 B2 | * | 5/2003 | Sakyo et al. ........... | 296/190.08 |
| 6,612,644 B2 | * | 9/2003 | Ahn ..................... | 296/187.04 |
| 6,695,396 B1 | * | 2/2004 | Schwab ................. | 296/203.02 |
| 7,246,846 B2 | * | 7/2007 | Shioji et al. ........... | 296/190.11 |
| 7,413,241 B2 | * | 8/2008 | Murakami et al. ..... | 296/190.08 |
| 2005/0006157 A1 | | 1/2005 | Shioji et al. | |
| 2007/0024088 A1 | * | 2/2007 | Mori et al. ............. | 296/190.08 |
| 2007/0132277 A1 | * | 6/2007 | Ishii et al. .............. | 296/190.01 |
| 2007/0273178 A1 | * | 11/2007 | Kelley et al. ........... | 296/190.08 |
| 2009/0026803 A1 | * | 1/2009 | Yano et al. ............... | 296/190.1 |
| 2009/0127888 A1 | * | 5/2009 | Tsukamoto et al. .... | 296/190.03 |

FOREIGN PATENT DOCUMENTS

EP    1 380 497 A2    1/2004

(Continued)

*Primary Examiner*—Lori L Lyjak
(74) *Attorney, Agent, or Firm*—Global IP Counselors

(57) ABSTRACT

A cab structure unit includes front-left and front-right pole members, a rear-left and rear-right pole members. The pole members include a pipe member that is bent in a substantially L shape. The pole members include a straight pipe member. The rear end of a beam portion of the pole member and the upper end of the pole member arranged on the left side surface side of the cab that includes an arc part formed along the revolution circle of revolving unit are arranged at deviated positions from each other. The rear end of the beam portion of the pole member and the upper end of the pole member arranged at deviated positions from each other are joined to each other by the rear beam member.

8 Claims, 13 Drawing Sheets

FOREIGN PATENT DOCUMENTS

| | | | |
|---|---|---|---|
| EP | 1775202 A2 * | 4/2007 |
| JP | 09-025648 A | 1/1997 |
| JP | 2001-182098 A | 7/2001 |
| JP | 2002-317466 A | 10/2002 |
| JP | 2004-306893 A | 11/2004 |
| JP | 2005-008035 A | 1/2005 |
| JP | 2007069799 A * | 3/2007 |

* cited by examiner

CAB STRUCTURE FOR CONSTRUCTION MACHINE

CROSS-REFERENCE TO RELATED APPLICATIONS

This U.S. National stage application claims priority under 35 U.S.C. §119(a) to Japanese Patent Application No. 2005-208251, filed in Japan on Jul. 19, 2005, the entire contents of which are hereby incorporated herein by reference.

TECHNICAL FIELD

The present invention relates to, in a construction machine such as a hydraulic excavator, an operator compartment (cab) structure that is mounted on a revolving unit that is revolvably mounted on a lower traveling unit.

BACKGROUND ART

In the field of civil engineering works that excavates earth, stone and so on, construction machines such as a hydraulic excavator (excavator) have been used in works.

This type of hydraulic excavator mainly includes a lower traveling unit, a revolving unit that is revolvably mounted to the lower traveling unit, and an operator compartment (cab) that is fixedly arranged on the revolving unit and accommodates an operator.

Recent years, operator rollover protection structure for operator compartments compliant with requirements such as EPOS (Excavator's Operator protection structure for over 6 tons hydraulic excavators: Japan Construction Mechanization Association Standard) is especially getting important. The rigidity improvement of cab structure becomes an important issue in terms of safety.

For example, Japanese Patent Laid-Open Publication TOKUKAI No. HEI 9-25648 (published on Jan. 28, 1997) discloses a cab structure for a construction machine (working vehicle) that includes a support pole that is composed of combined inner and outer plates, and a reinforcing member such as a steel pipe that is arranged in hollow space inside the support pole.

According to this structure, the rigidity of the cab structure can be greatly improved against deformation in case of a rollover accident of the construction machine as compared with a cab structure that is composed of only sheet metal members such as inner and outer plates.

SUMMARY OF THE INVENTION

However, the aforementioned known cab structure for construction machine has the following problems.

That is, in the cab structure for a construction machine that is disclosed in the above mentioned publication, although the rigidity improvement of the operator compartment can ensure the safety of the operator compartment, but additionally provided reinforcement member increases the number of parts, and thus may increase costs.

Also, in a construction machine that has a protrusion length of a revolving unit from a lower traveling unit in revolving operation not more than a predetermined ratio of the revolving radius of the revolving unit in plan view, in other words, in a construction machine to which a so-called small rear-swing radius type cab structure is adopted, it is necessary to satisfy the limitation on the shape of a cab by protrusion amount limitation but to increase an operator compartment in size as much as possible for operator comfort, and to provide sufficient rigidity. For this reason, in the cab structure that is disclosed in the above mentioned publication, since the number of parts increases, it cannot be said that the cab structure provides both sufficient space and sufficient rigidity for the operator compartment.

It is an object of the present invention to provide a cab structure for a construction machine that has a protrusion length of a revolving unit from a lower traveling unit in revolving operation not more than a predetermined ratio of the revolving radius R of the revolving unit in plan view (in other words, a so-called small rear-swing radius type cab structure), and can ensure sufficient rigidity against a load that is applied to the cab structure in a rollover accident without increasing the number of parts.

A cab structure for a construction machine according to a first aspect of the present invention is fixedly arranged on a revolving unit that is revolvably mounted on a lower traveling unit, and includes an arc part that is formed along a revolution circle on one side surface of a cab not to extend outside of a predetermined revolving radius. The cab structure includes first pole members, second pole members, and a first joint member. The first pole members extend from a front-right end to a rear-right end of the cab, and from a front-left end to a rear-left end of the cab. Each of the first pole members is composed of a pipe member that is bent in a substantially L shape. Each of the first pole members includes a pole portion that is substantially arranged along a vertical direction and a beam portion that is substantially arranged along a horizontal direction. The second pole members are substantially arranged along the vertical direction at the rear-right end and the rear-left end of the cab. Each of the second pole members is composed of a substantially straight pipe member. The upper end of one of the second pole members that is arranged at the rear end of the one side surface on a side that includes the arc part is deviated from a plane that is defined by one of the first pole members on the side that includes the arc part. The first joint member couples an upper ends of the second pole members that are arranged at the rear-left end and the rear-right end of the cab. The first joint member couples a rear end of the beam portion of the one of the first pole members and the upper end of the one of the second pole members to each other.

In this configuration, in a cab structure for a small rear-swing radius type construction machine that has the length of a revolving unit that protrudes from a lower traveling unit in plan view when the revolving unit revolves is not more than 10% of the revolving radius, first and second pole members that are composed of a pipe member are used as a pole member at four corners of the substantially box-shaped cab. The first pole members extend from the front-right end to the rear-right end of the cab, and from the front-left end to the rear-left end of the cab. The first pole members are composed of two pipe members that are bent in a substantially L shape. Also, the first pole members include pole portions that are arranged at the front-left end and the front-right end of the cab, and extend substantially in the vertical direction, and beam portions that extend from the front-left end upper part and the front-right end upper part of the cab to the rear-left end upper part and the rear-right end upper part of the cab. Of the two second pole members that are arranged at the rear-left end and the rear-right end of the cab, the upper end of one of the second pole members that is arranged at the rear end part of the arc part that is formed on one side surface of the cab is deviated from the rear end of the beam portion of one of the first pole members on the side that includes the arc part. A first joint member couples the upper ends of the second pole members that are arranged at the rear-left end and the rear-right end of the cab. Also, the first joint member couples the rear end of the beam portion of the one of the first pole members and the upper end of the one of the second pole members that are deviated from each other.

Note that examples of the aforementioned construction machines can be provided by a hydraulic excavator, and a crane that include a cab (operator compartment) and various types of construction units on a revolving unit, for example. Also, an example of the aforementioned small rear-swing radius type construction machine can be provided by a construction machine that is designed to have a revolving radius so that the length of a revolving unit with an operator compartment that protrudes from a lower traveling unit in plan view when the revolving unit revolves is not more than 10% of the revolving radius. Note that the directions of front and rear, and left and right used in the aforementioned configuration refer to the directions as viewed by the operator who operates the construction machine in the operator compartment.

Thus, since, in order to provide a cab with a predetermined revolving radius such as in the case of a small rear-swing radius type construction machine, the one side surface of the cab is formed in a round shape including an arc part, the joint parts of the one of the first pole members and the one of the second pole members that are composed of a pipe member are deviated from each other. Even in this case, the first joint member can couples the one of the first pole members and the one of the second pole members to each other. The first joint member also serves as a beam that couples the second pole members to each other. Therefore, the first and second pole members can be coupled to each other without increase in the number of parts. In addition to this, since the first and second pole members are composed of a pipe member, as compared with a conventional cab structure that is composed of sheet metal members, it is possible to improve the rigidity of the cab without increase in the number of parts.

In a cab structure for a construction machine according to a second aspect of the present invention in the cab structure for a construction machine according to the first aspect of the present invention, the first pole members are arranged in parallel to each other, and an interval between the first pole members that are arranged at the front-left end and the front-right end of the cab differs from an interval between the second pole members that are arranged at the rear-left end and the rear-right end of the cab.

In this case, the members can be arranged so that the interval between the second pole members that are arranged at the rear-left end and the rear-right end of the cab is longer than the interval between the first pole members that are arranged at the front-left end and the front-right end of the cab.

In this case, the two first pole members that are arranged at the front-left end and the front-right end of the cab can be arranged so that the pole portion and the beam portion of one of the first pole members are parallel to the other of the first pole members. Accordingly, the rear end of the beam portion of the first pole member that is arranged in the upper part of the side surface on the side that includes the arc part is deviated from the upper end of the second pole member on the side that includes the arc part.

In the cab structure according to the present invention, since the first and second pole members that are deviated from each other are coupled by the first joint member, it is possible to provide a cab structure that ensures the operator's wide range of vision from the operator compartment, and sufficient rigidity.

In a cab structure for a construction machine according to a third aspect of the present invention in the cab structure for a construction machine according to the first or second aspect of the present invention, the cab structure further includes a second joint member that couples the pole portion of the one of the first pole members and the one of the second pole members on the side that includes the arc part, and the first joint member to each other.

In this configuration, a second joint member that couples the pole portion of the first pole member, the second pole member, and the first joint member on the side that includes the arc part to each other is further provided.

Accordingly, it is possible to more firmly couple the first and second pole members and the first joint member as principal members in the cab structure to each other. In addition, in the case where a third pole member is further arranged between the pole portion of the first pole member and the second pole member, the beam portion of the first pole member and the upper end of the third pole member can be joined by the second joint member. Consequently, it is possible to provide a cab structure with further improved rigidity.

In a cab structure for a construction machine according to the fourth aspect of the present invention in the cab structure for a construction machine according to the third aspect of the present invention, the second joint member is a sheet metal member that has a substantially L shape in section.

In this invention, a sheet metal member that has a substantially L shape in section is used as the second joint member that couples the end of the first pole member, the end of the second pole member, and the first joint member that couples the ends of the first and second pole members to each other, for example.

Accordingly, as compared with the case where a pipe member is used as the second joint member, the end of the cab can be easily formed in desired shapes, and additionally in the case where electric wiring is accommodated in the interior side of the second joint member it is possible to save space of the cab structure.

In a cab structure for a construction machine according to a fifth aspect of the present invention in the cab structure for a construction machine according to the third aspect of the present invention, the cab structure further includes a third pole member that is substantially arranged along the vertical direction, and an upper end of the third pole member is joined to the second joint member at a position between the pole portion of the one of the first pole members and the one of the second pole members on the side that includes the arc part.

In this case, in the cab structure that includes the first pole members and the second pole members that are arranged at four corners in the substantially box-shaped cab structure, a third pole member is arranged as a third pillar between the first pole member and the second pole member on the side that includes the arc part.

Accordingly, in the case where a slide door or a hinged door is mounted on the one side surface on the side surface that includes the arc part, for example, it is possible to ensure strength required to support the weight of the door, and to improve the rigidity of the cab.

In a cab structure for a construction machine according to a sixth aspect of the present invention in the cab structure for a construction machine according to the first aspect of the present invention, the first joint member is a sheet metal member that has a substantially L shape in section.

In this configuration, a sheet metal member that has a substantially L shape in section is used as the first joint member that couples the ends of the ones of the first and second pole members, which are deviated from each other, to each other, for example.

Accordingly, as compared with the case where a pipe member is used as the first joint member, the end of the cab can be easily formed in desired shapes, and additionally in the case where electric wiring is accommodated in the interior side of the first joint member it is possible to save space of the cab structure.

In a cab structure for a construction machine according to a seventh aspect of the present invention in the cab structure for a construction machine according to the first aspect of the present invention, a stepping into/off slide door is mounted on the one side surface on the side that includes the arc part.

In this configuration, a slide door through which an operator steps into/off the operator compartment is arranged on one side surface of the cab that includes the arc part that is formed along a revolution circle.

In this case, since the side surface on the side that includes the aforementioned arc part is formed along a revolution circle, the side surface on the side that includes the aforementioned arc part is usually located on the outside of the body of a construction machine.

Accordingly, since the slide door is mounted on the side surface of the cab that is located on the outside of the body of a construction machine, the operator can easily step into/off the operator compartment. Also, in the case where the slide door is accommodated in the arc part that bulges outward, it is possible to provide a cab structure with good accommodation that allocates the arc part to the slide space of the slide door.

In a cab structure for a construction machine according to an eighth aspect of the present invention in the cab structure for a construction machine according to the first aspect of the present invention, at least one of the pipe members is composed of a steel pipe member with a deformed shape in section.

In this case, a steel pipe member is used as the pipe member which has neither a simple sectionally circular nor a simple rectangular shape but has a sectionally deformed shape that is defined by a plurality of arc and straight parts in combination with each other.

In the case where a pipe member is used which has a sectionally deformed shape that fits a fit part that receives window glass and the like, for example, it is possible to provide a cab structure for a construction machine that reduces the number of parts, and enhances the appearance of the cab structure.

A cab structure for a construction machine according to a ninth aspect of the present invention is fixedly arranged on a revolving unit that is revolvably mounted on a lower traveling unit, and includes an arc part that is formed along a revolution circle on one side surface of a cab not to extend outside of a predetermined revolving radius. The cab structure includes first pole members, s second pole members, and a first joint member. The first pole members extend from a front-right end to a rear-right end of the cab, and from a front-left end to a rear-left end of the cab. Each of the first pole members is composed of a pipe member that is bent in a substantially L shape. Each of the first pole members includes a pole portion that extends substantially in a vertical direction and a beam portion that is substantially arranged along a horizontal direction. The second pole members are substantially arranged along the vertical direction at the rear-right end and the rear-left end of the cab. Each of the second pole members is composed of a substantially straight pipe member. The upper end of one of the second pole members that is arranged at a rear end of the one side surface on a side that includes the arc part is arranged at a different phase from the beam portion of one of the first pole members on the side that includes the arc part. The first joint member couples an upper ends of the second pole members that are arranged at the rear-left end and the rear-right end of the cab. The first joint member couples a rear end of the beam portion of the one of the first pole members and the upper end of the one of the second pole members.

In this configuration, in a cab structure for a small rear-swing radius type construction machine that has a length that protrudes from a lower traveling unit in plan view in a revolving operation is not more than a predetermined ratio of the revolving radius, first and second pole members that are composed of a pipe member are used as a pole member at four corners of the substantially box-shaped cab. The first pole members extend from the front-right end of the cab to the rear-right end, and from the front-left end to the rear-left end. The first pole members are composed of two pipe members that are bent in a substantially L shape. Also, the first pole members includes pole portions that are arranged at the front-left end and the front-right end of the cab, and extend substantially in the vertical direction, and beam portions that extend from the front-left end upper part and the front-right end upper part of the cab to the rear-left end upper part and the rear-right end upper part of the cab. Of the two second pole members that are arranged at the rear-left end and the rear-right end of the cab, the upper end of one of the second pole members that is arranged at the rear end part of the arc part that is formed on one side surface of the cab is arranged at a different phase from the rear end of the beam portion of one of the first pole members on the side that includes the arc part. A first joint member couples upper ends of the second pole members that are arranged at the rear-left end and the rear-right end of the cab. Also, the first joint member couples the rear end of the beam portion of the one of the first pole member and the upper end of the one of the second pole member that is arranged at a different phase from each other.

Note that an example of the aforementioned construction machine can be provided by a hydraulic excavator, a crane that includes a cab (operator compartment), and various types of construction equipment on a revolving unit, for example. Also, an example of the aforementioned small rear-swing radius type construction machine can be provided by a construction machine that is designed to have a revolving radius so that the length of a revolving unit with an operator compartment that protrudes from a lower traveling unit in plan view when the revolving unit revolves is not more than 10% of the revolving radius. Note that the directions of front and rear, and left and right used in the aforementioned configuration refer to the directions as viewed by the operator who operates the construction machine in the operator compartment. Also, arrangement of members that are arranged at different phase from each other refers to a relationship of lines that extend from the members do not intersect.

Accordingly, since, in order to provide a cab with a predetermined revolving radius such as in the case of a small rear-swing radius type construction machine, one side surface of the cab is formed in a round shape including an arc part, the joint parts of the first pole member and the second pole member that are composed of a pipe member are arranged at different phase from each other. Even in this case, the first joint member can couples the first pole member and the second pole member to each other. The first joint member also serves as a beam that couples the second pole members to each other. Therefore, the first and second pole members can be coupled to each other without increase in the number of parts. In addition to this, since the first and second pole members are composed of a pipe member, as compared with a conventional cab structure that is composed of sheet metal members, it is possible to improve the rigidity of the cab without increase in the number of parts.

DETAILED DESCRIPTION OF THE PREFERRED EMBODIMENTS

With reference to FIGS. 1 through 13, the following description will describe a hydraulic excavator (construction machine) 1 that includes an operator compartment (cab) to which a cab structure for a construction machine according to one embodiment of the present invention is adopted.

Figure 1:
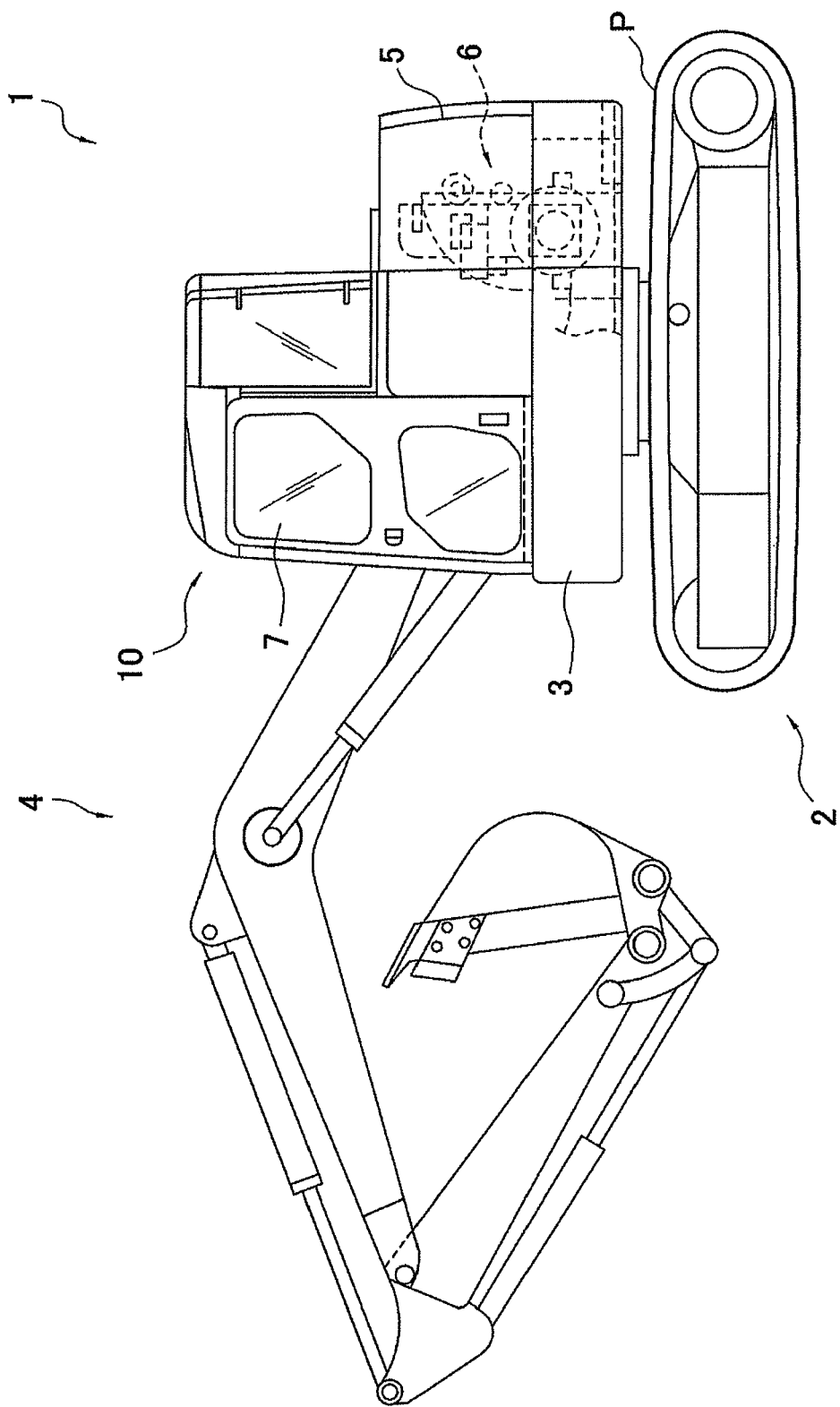
FIG. 1 is a side view of the outline of a hydraulic excavator according to one embodiment of the present invention.

As used herein to describe the present invention, terms "left and right", "front and rear", and "front portion and rear portion" should be interpreted as directions relative to an operator when sitting on a seat in a cab 10 (see FIG. 1, for example).

Entire Configuration of Hydraulic Excavator 1

Figure 2:
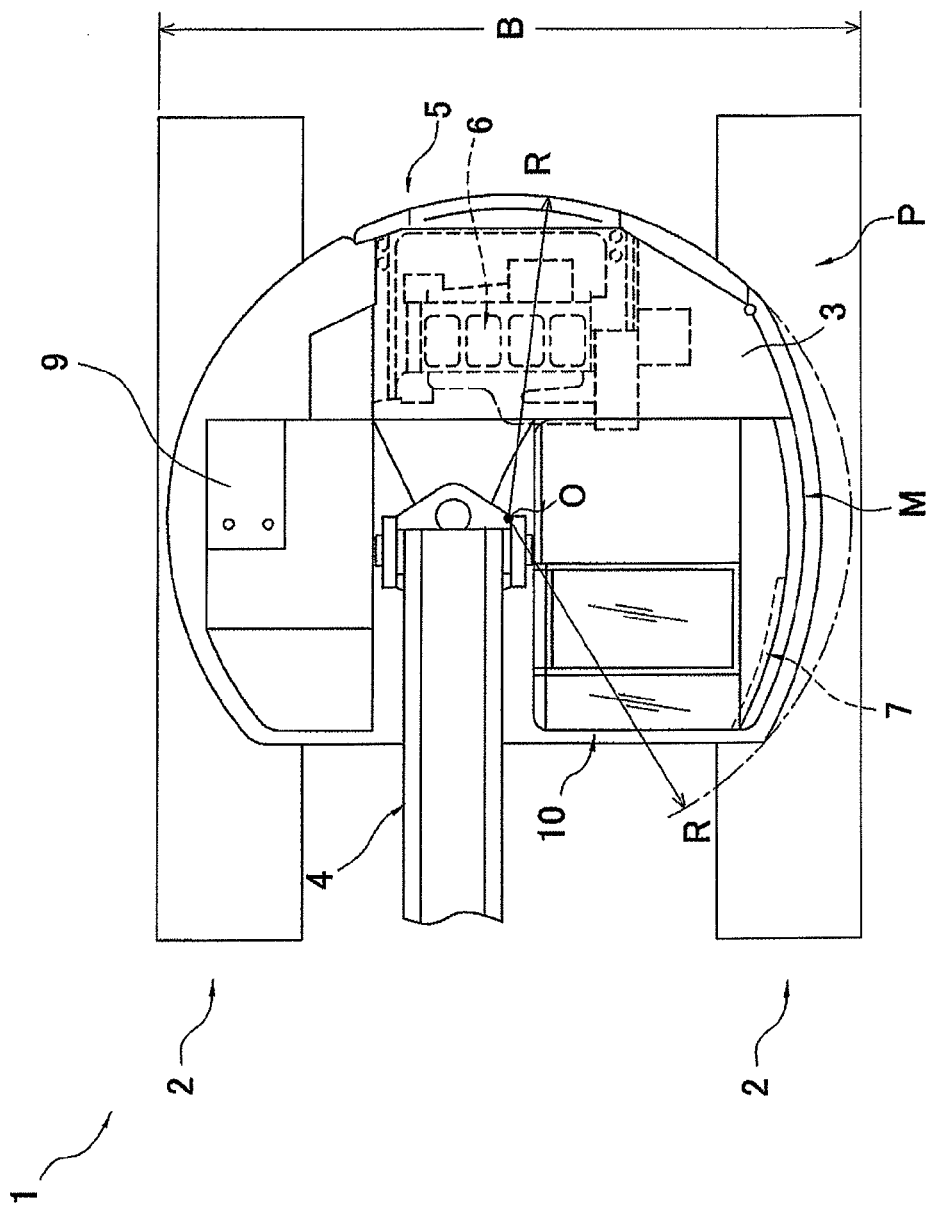
FIG. 2 is a plan view showing the hydraulic excavator shown in FIG. 1.

The hydraulic excavator 1 according to this embodiment includes a lower traveling unit 2, a revolving unit 3, a working portion 4, a counterweight 5, an engine 6, an equipment compartment 9, and the cab 10, as shown in FIGS. 1 and 2. The hydraulic excavator 1 is a small rear-swing radius type hydraulic excavator that has the revolving radius R of the machine except the working portion 4 (see FIG. 2) not more than a predetermined value. The length of the revolving unit 3 that protrudes from the lower traveling unit 2 in plan view when the revolving unit 3 revolves is not more than 10% of the revolving radius.

The lower traveling unit 2 drives endless belts P that are wounded on the left and right sides of the lower traveling unit 2 relative to the advance direction so that the hydraulic excavator 1 moves frontward and rearward. The revolving unit 3 is revolvably mounted on the upper side of the lower traveling unit 2.

The revolving unit 3 can revolve in either direction on the lower traveling unit 2. The working portion 4, the counterweight 5, the engine 6, and the cab 10 are mounted on the upper side of the revolving unit 3.

The working portion 4 includes a boom, an arm that is mounted to the fore end of the boom, and a bucket that is mounted to the fore end of the arm. The working portion 4 moves the arm, the bucket, and the like upward and downward by means of hydraulic pressure cylinders to excavate earth and stones in the field of civil engineering works.

The counterweight 5 is composed of scrap iron, concrete and the like that are fixed in a box that is composed of steel plates, for example, and is arranged on the rear side of the revolving unit 3 to keep the balance of a machine body in an excavation work or the like.

The engine 6 is a power source that powers the lower traveling unit 2 and the working portion 4, and is arranged in proximity to the counterweight 5.

The equipment compartment 9 is arranged at the side of the working portion 4, and accommodates a fuel tank, a hydraulic oil tank, operation valves and the like (not shown).

The cab 10 is an operator compartment of the hydraulic excavator 1 where the operator steps into/off, and is arranged on the front-left side of the revolving unit 3 at the side of the working portion 4 to provide a clear sight line to the fore end of the working portion 4 for the operator. The cab configuration of the cab 10 will be described later.

Configuration of Cab 10

Figure 3:
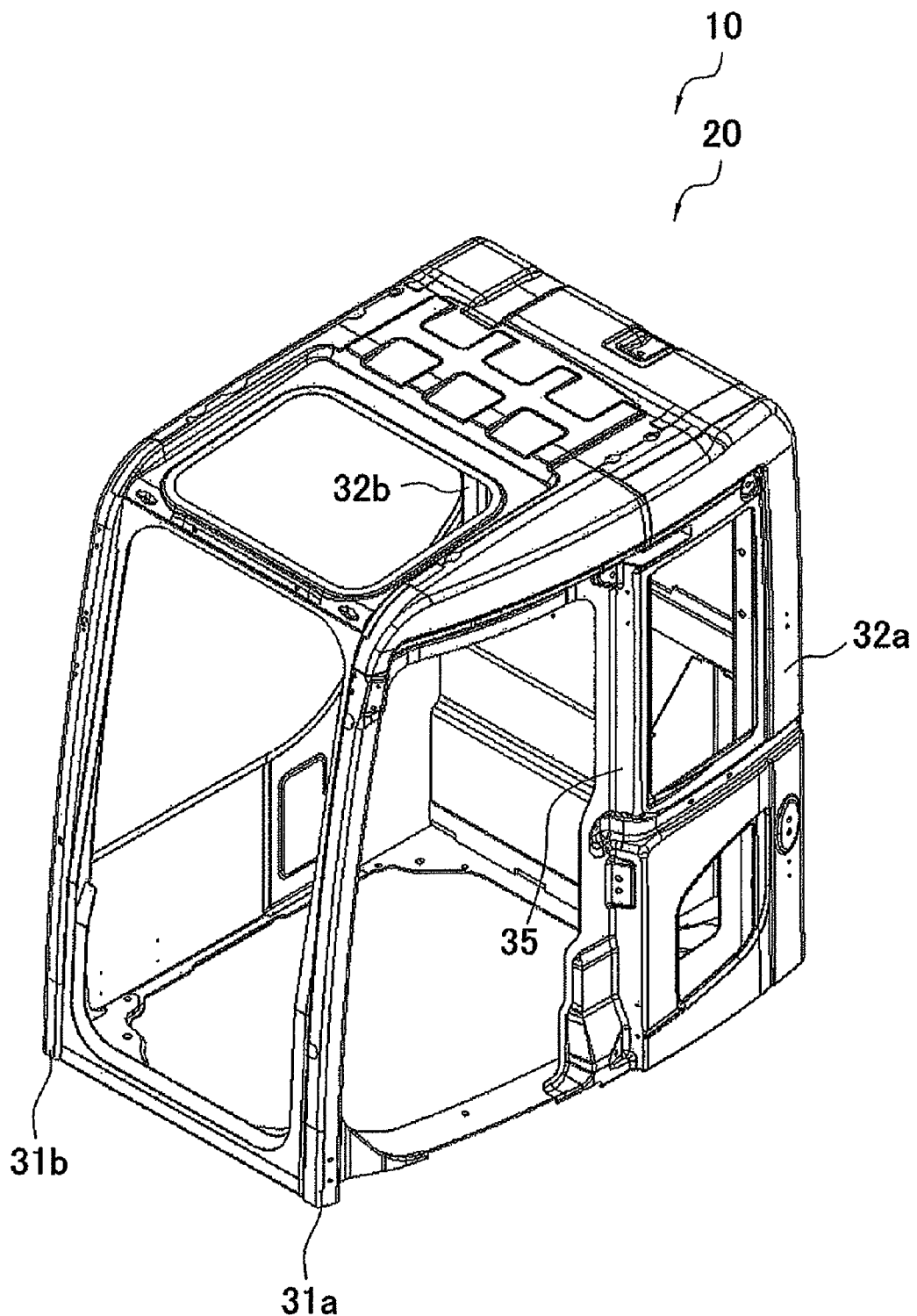
FIG. 3 is a perspective view showing a cab structure that is installed on the hydraulic excavator shown in FIG. 1.

The cab 10 is a box-shaped structure that includes pole members 31a, 31b, 32a and 35, and the like as shown in FIG. 3. As shown in FIG. 2, a central part M (hereinafter, referred to as an arc part) of the side portion on the left side of the cab 10 has an arc shape (round shape) that bulges to extend substantially along a peripheral part of a circle with a radius R that centers the revolving center O of the revolving unit 3. Accordingly, the hydraulic excavator 1 can be a small rear-swing radius type hydraulic excavator that includes the revolving unit 3 is prevented from largely protruding outward of the lower traveling unit 2 even in revolving operation, and therefore the hydraulic excavator 1 can be operated even in narrow space in the case of roadwork or the like. In addition, a slide door 7 is mounted on the arc part so that the operator steps into/off the cab 10. Thus, even when the slide door 7 is opened, the slide door 7 can be prevented from protruding outward of the revolving radius R of the revolving unit 3. Consequently, it is possible to maximize the interior capacity of the cab 10 without interference of the cab 10 that protrudes from the machine body width B (see FIG. 2) with a fixed structure or the like in proximity to the cab 10.

Figure 4:
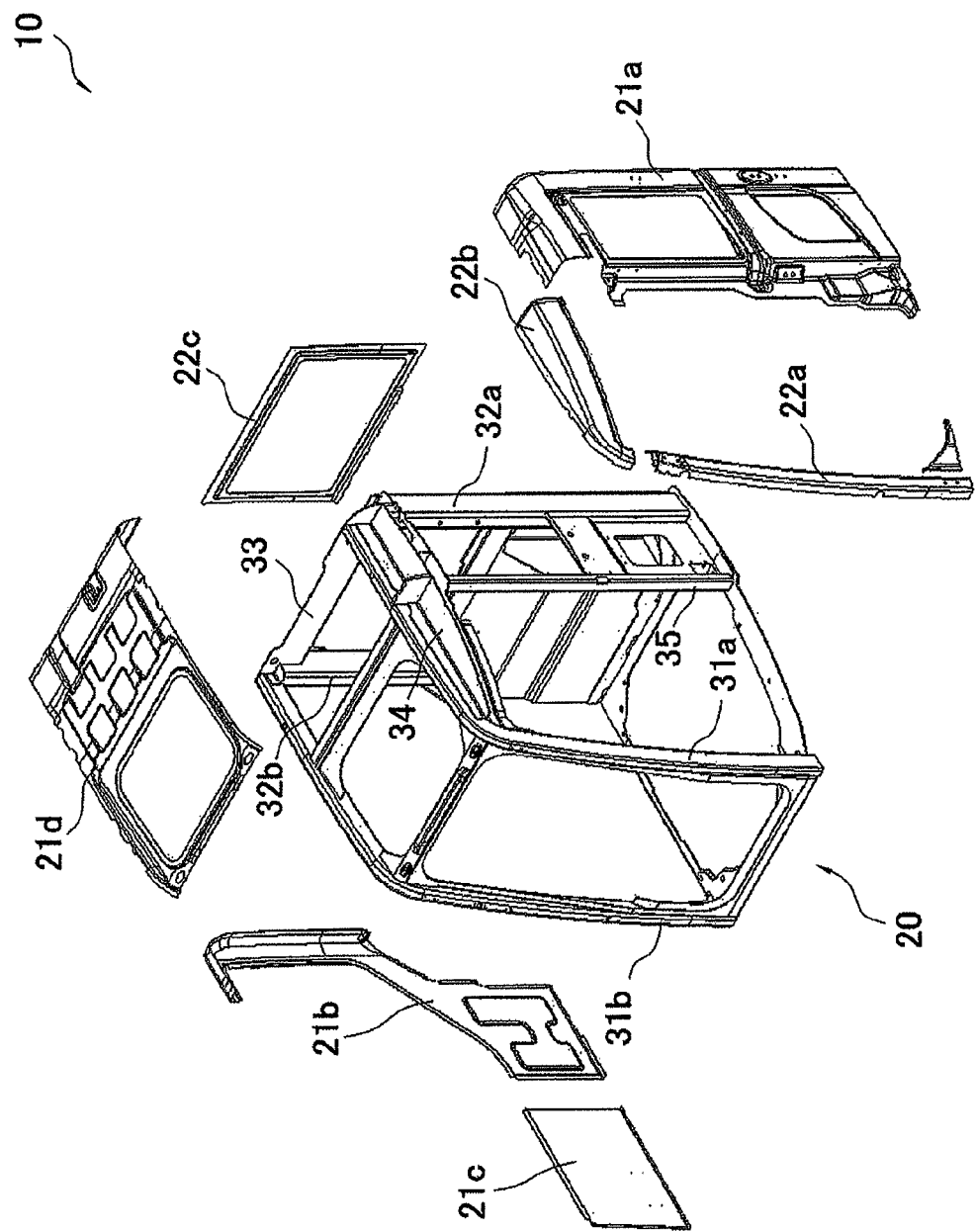
FIG. 4 is an exploded perspective view showing the configuration of the cab shown in FIG. 3.

Also, as shown in FIG. 4, in the cab 10, side panels 21a, 21b and 21c, a roof panel 21d, side frames 22a and 22b, and a rear portion frame 22c are mounted to a cab structure unit 20 (discussed later). Note that glass (not shown) is fitted into window frames that are formed by the panels 21a to 21d and the frames 22a to 22c. Thus, space that accommodates the operator is formed in the cab 10.

The side panel 21a and the side frames 22a and 22b that are mounted on the left side surface of the cab 10 are mounted to a part of the cab structure unit 20 that has the aforementioned arc shape that lies on the left side surface of the cab 10. For this reason, the side panel 21a and the side frames 22a and 22b have a shape that bulges radially of a circle that centers the revolving center O.

Figure 5:
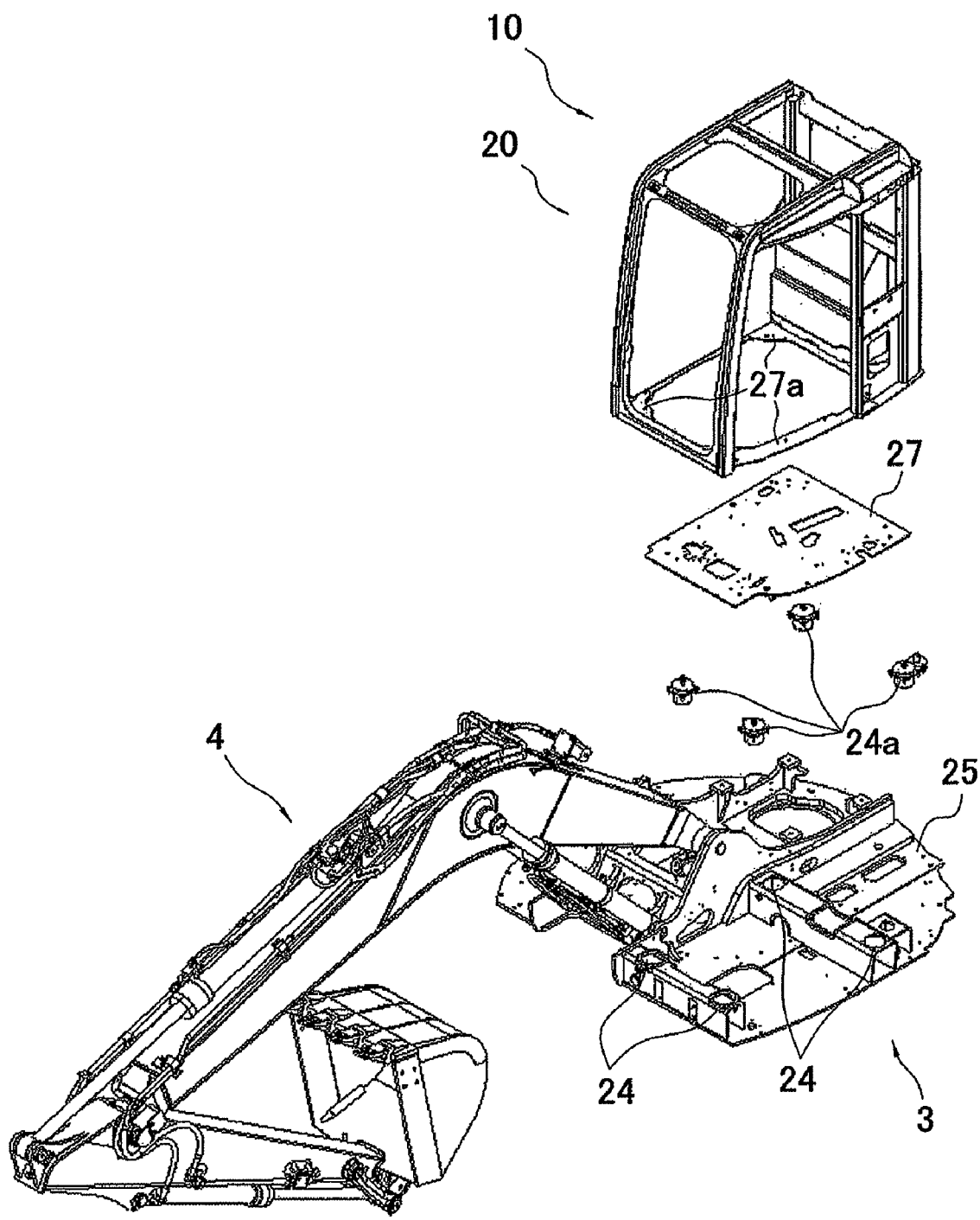
FIG. 5 is a view showing mounting arrangement of the cab shown in FIG. 3 onto a revolving unit.

Also, as shown in FIG. 5, the cab 10 is installed on four mount portions 24 that are formed in the front-left side of the revolving frame 25 as the upper portion of the revolving unit 3 with vibration isolators 24a and a floor panel 27 being fastened on a floor frame 27a of the cab 10 by bolts (not shown). Thus, the cab 10 is fixedly supported on the revolving unit 3 (revolving frame 25) at the four points.

Also, the cab 10 includes the cab structure unit 20 that serves as a framework portion. Members that compose the cab structure unit 20 will be described later, specifically.

Configuration of Cab Structure Unit 20

In the hydraulic excavator 1 according to this embodiment, the framework portion that composes the cab 10 is composed of a plurality of pole members and beam members in combination with each other.

Figure 6:
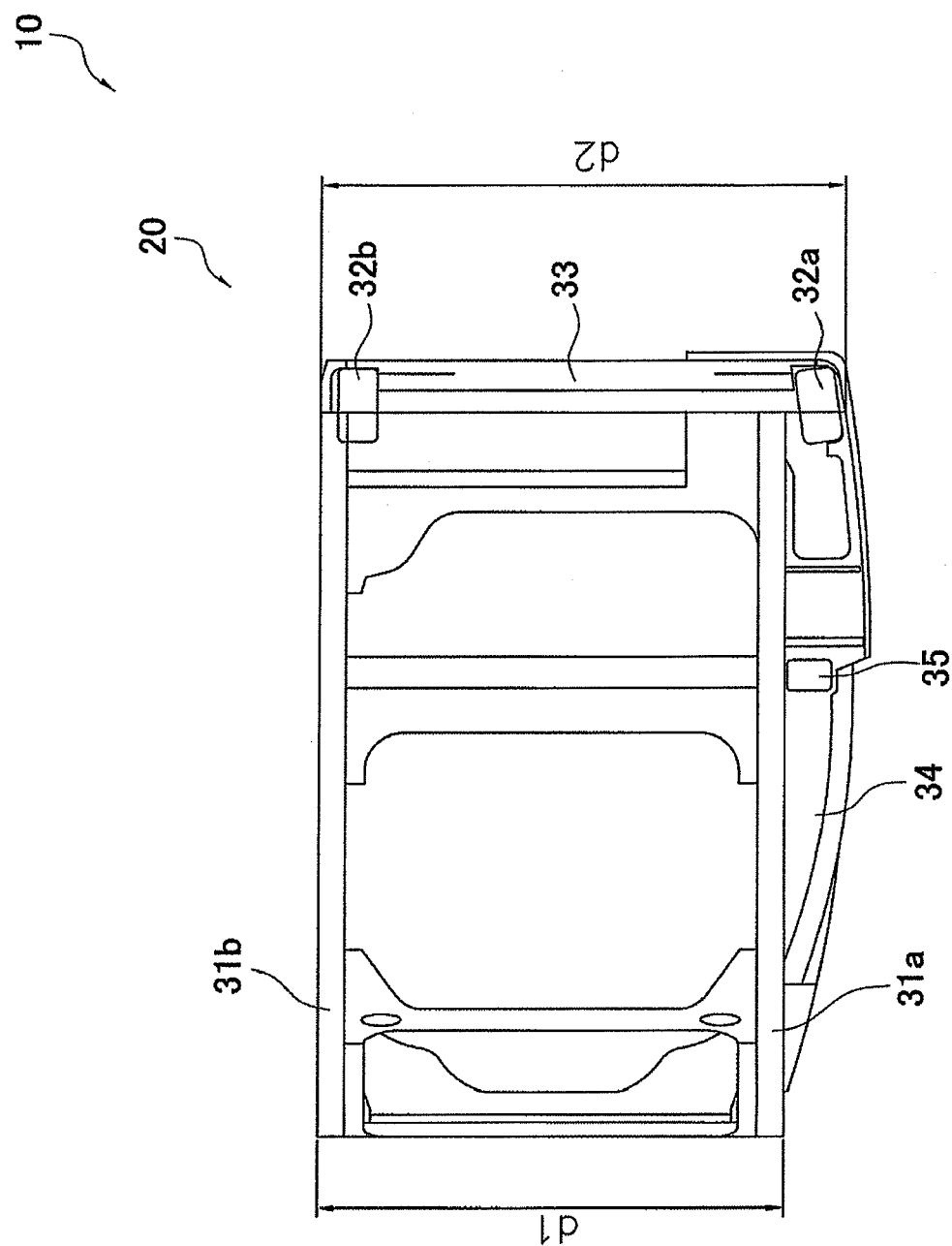
FIG. 6 is a plan view showing the configuration of the cab shown in FIG. 3.

Specifically, as shown in FIGS. 4 and 6, the cab structure unit 20 includes a front-left pole member (first pole member) 31a, a front-right pole member (first pole member) 31b, a rear-left pole member (second pole member) 32a, a rear-right pole member (second pole member) 32b, a rear beam member (first joint member) 33, a side beam member (second joint member) 34, and a support pole member (third pole member) 35.

Figure 14:
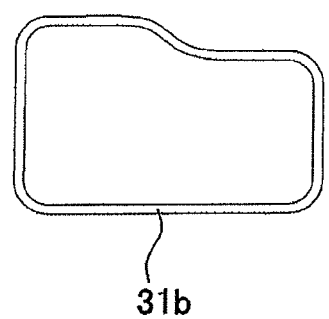
FIG. 14 is an additional drawing. Cross-sectional view showing a steel pipe that is included in the pole members shown in FIG. 7, and has a deformed shape in section.

Of the aforementioned members, the pole members 31a, 31b, 32a and 32b that are arranged at four of front-left, front-right, rear-left and rear-right corners of the cab structure unit 20 are composed of a pipe member. Accordingly, as compared with a conventional cab structure unit that is composed of combined sheet metal members, it is possible to largely improve the rigidity of the cab. Also, the front-left pole member 31a has a rectangular shape in section, and the front-right pole member 31b has a sectionally deformed shape that is defined by a plurality of arc and straight parts in combination with each other to receive the window glass fitted thereto as shown in FIG. 14.

Figure 7:
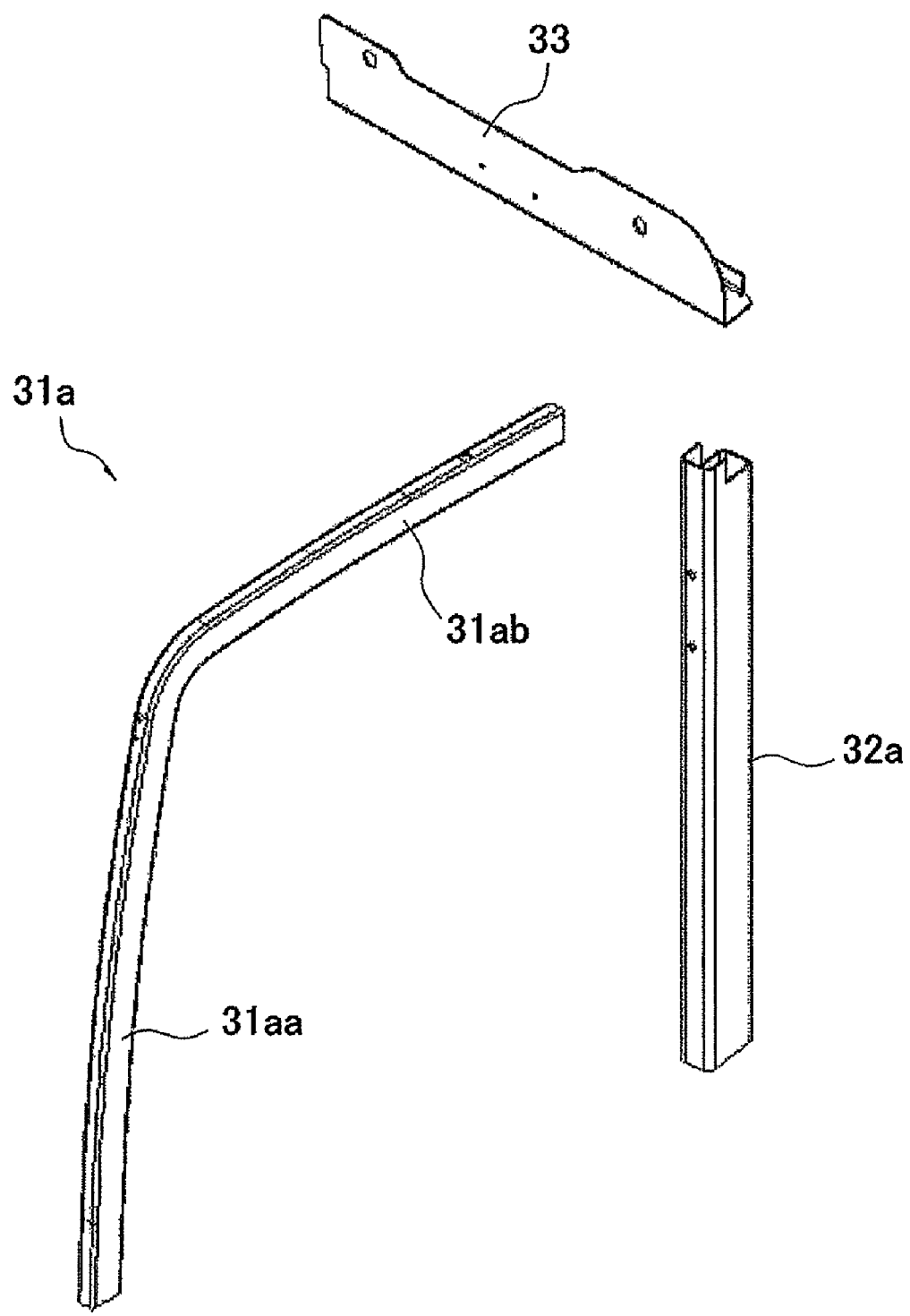
FIG. 7 is an exploded perspective view showing the configuration of pole members and the like that compose the skeletal outline of the cab shown in FIG. 3.

As shown in FIG. 7, the front-left pole member 31a is composed of a pipe member that is bent in proximity to the middle part of the pipe member, and includes a pole portion 31aa that is substantially arranged along the vertical direction, and a beam portion 31ab that is substantially arranged along the horizontal direction. Since one pipe member is thus bent to form the pole portion 31aa and the beam portion 31ab, it is possible to reduce the number of parts and additionally to provide the cab structure unit 20 with high rigidity. Note that the same goes for the front-right pole member 31b.

As shown in FIG. 7, the rear-left pole member 32a is composed of one pipe member, and is substantially arranged along the vertical direction. Also, a cut-off portion is formed at the upper end of the rear-left pole member 32a to fit with the shape of the rear beam member 33 to be joined to the rear-left pole member 32a. The cut-off portion is joined to the side surface of the rear beam member 33. In addition, the lower end of the rear-left pole member 32a is mounted to the floor frame 27a. Also, the floor frame 27a is mounted at parts that are located substantially right above the aforementioned mount portions 24 together with the floor panel 27 through the vibration isolators 24a.

Similarly to the rear-left pole member 32a, the rear-right pole member 32b is composed of one pipe member, and is substantially arranged along the vertical direction. Also, a cut-off portion is formed at the upper end of the rear-right pole member 32b to fit with the shape of the rear beam member 33 to be joined to the rear-right pole member 32b, and the cut-off portion is joined to the side surface of the rear beam member 33. The lower end of the rear-right pole member 32b does not reach the level (height position) of the floor frame 27a.

Figure 8:
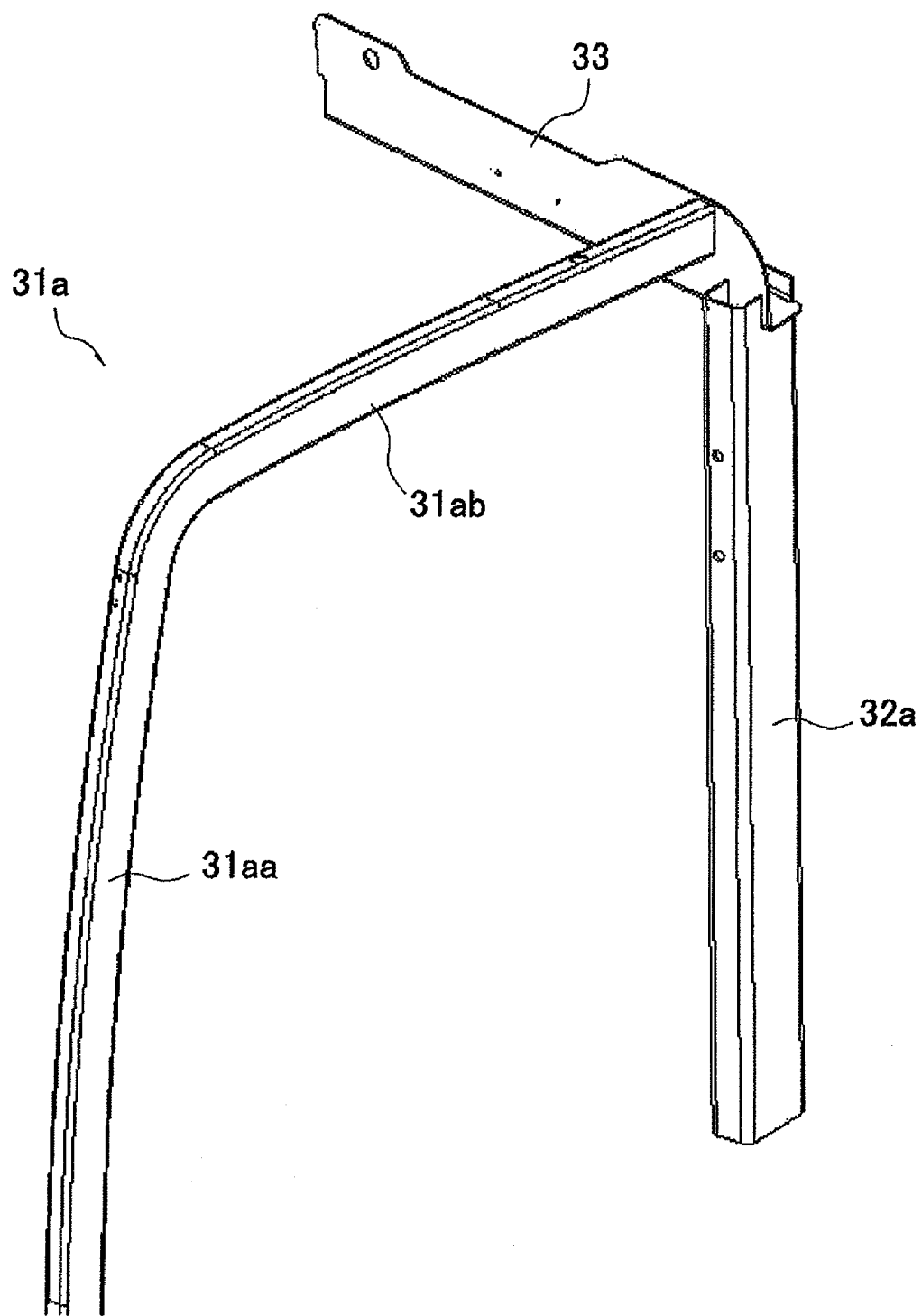
FIG. 8 is a view of the assembled pole members and the like shown in FIG. 7.

As shown in FIG. 7, the rear beam member 33 is composed of a sheet metal member that has a substantially L shape in section. As shown in FIG. 8, the rear beam member 33 couples the rear end portions of the respective beam portions 31ab and 31bb of the front-left and front-right pole members 31a and 31b, and the upper ends of the rear-left and rear-right pole members 32a and 32b to each other. More specifically, the rear ends of the beam portions 31ab and 31bb of the front-left and front-right pole members 31a and 31b are joined to the surface of the substantially sectionally L-shaped rear beam member 33 that is substantially parallel to the vertical direction. The upper ends of the rear-left and the rear-right pole members 32a and 32b are joined to the surface of the substantially sectionally L-shaped rear beam member 33 that is substantially parallel to the horizontal direction.

Figure 9:
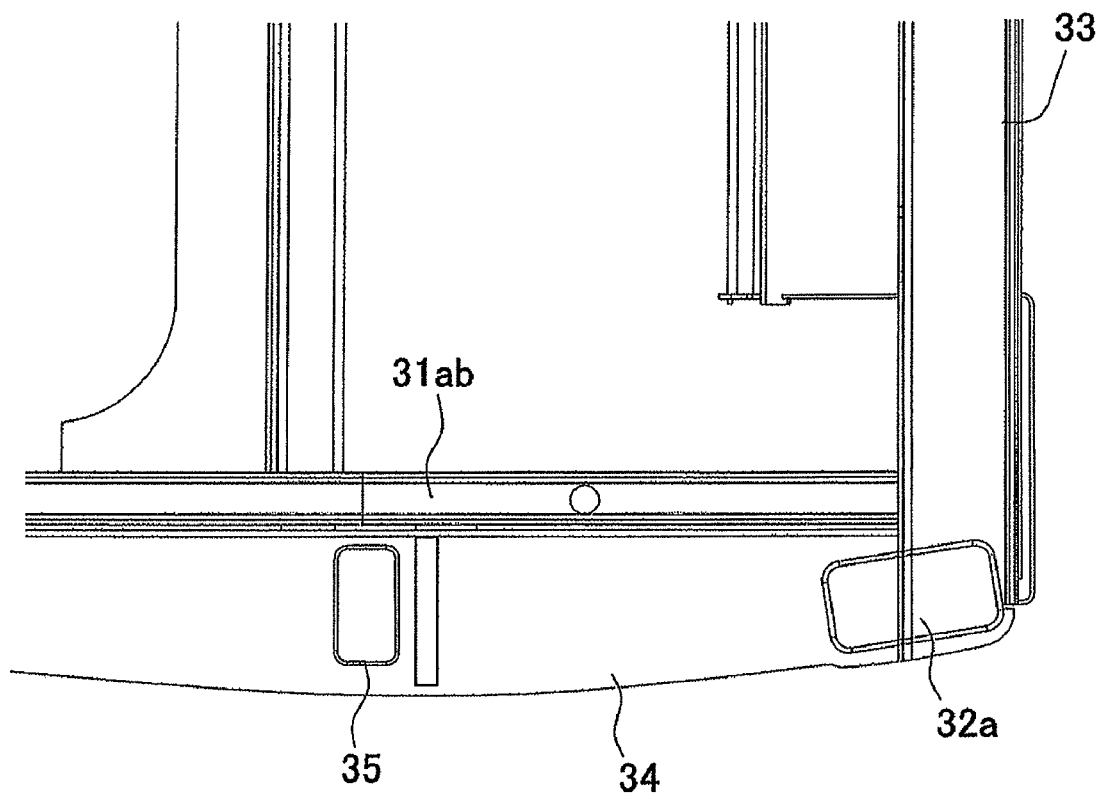
FIG. 9 is an enlarged plan view showing the arrangement of the assembled pole members and the like shown in FIG. 7.

In this configuration, the joint parts of the front-left pole member 31a and the rear-left pole member 32a (the rear end of the beam portion 31ab of the front-left pole member 31a, and the upper end of the rear-left pole member 32a) are arranged at different phase from each other, as shown in FIGS. 8 and 9. This phase difference results from the shape of the cab 10 that includes the arc part on the side part of the cab 10 to compose the aforementioned small rear-swing radius type hydraulic excavator 1. Specifically, in the cab structure unit 20, as shown in FIG. 6, the front-left and front-right pole members 31a and 31b are arranged in parallel to each other, and the pole members 31a, 31b, 32a, and 32b are arranged so that the interval d1 between the front-left and front-right pole members 31a and 31b may differ from the interval d2 between the rear-left and rear-right pole members 31a and 32b. For this reason, in the cab 10, the rear side width is wider than the front side width. As a result, in the case where the front-left and front-right pole members 31a and 31b are arranged in parallel to each other, this causes the phase difference between the joint parts of the front-left and rear-left pole members 31a and 32a that are arranged on the left side including the arc part. In other words, the front-left and rear-left pole members 31a and 32a has a positional relationship in that the front-left and rear-left pole members 31a and 32a do not intersect if they are elongated.

In the hydraulic excavator 1 according to this embodiment, even in the case where the cab 10 is thus configured suitably for small rear-swing radius type hydraulic excavators, the rear beam member 33 that is used as a joint member solves a problem of the phase difference between the joint parts of the pole members 31a and 32a caused by the configuration of the cab suitable for small rear-swing radius type hydraulic excavators.

Figure 10:
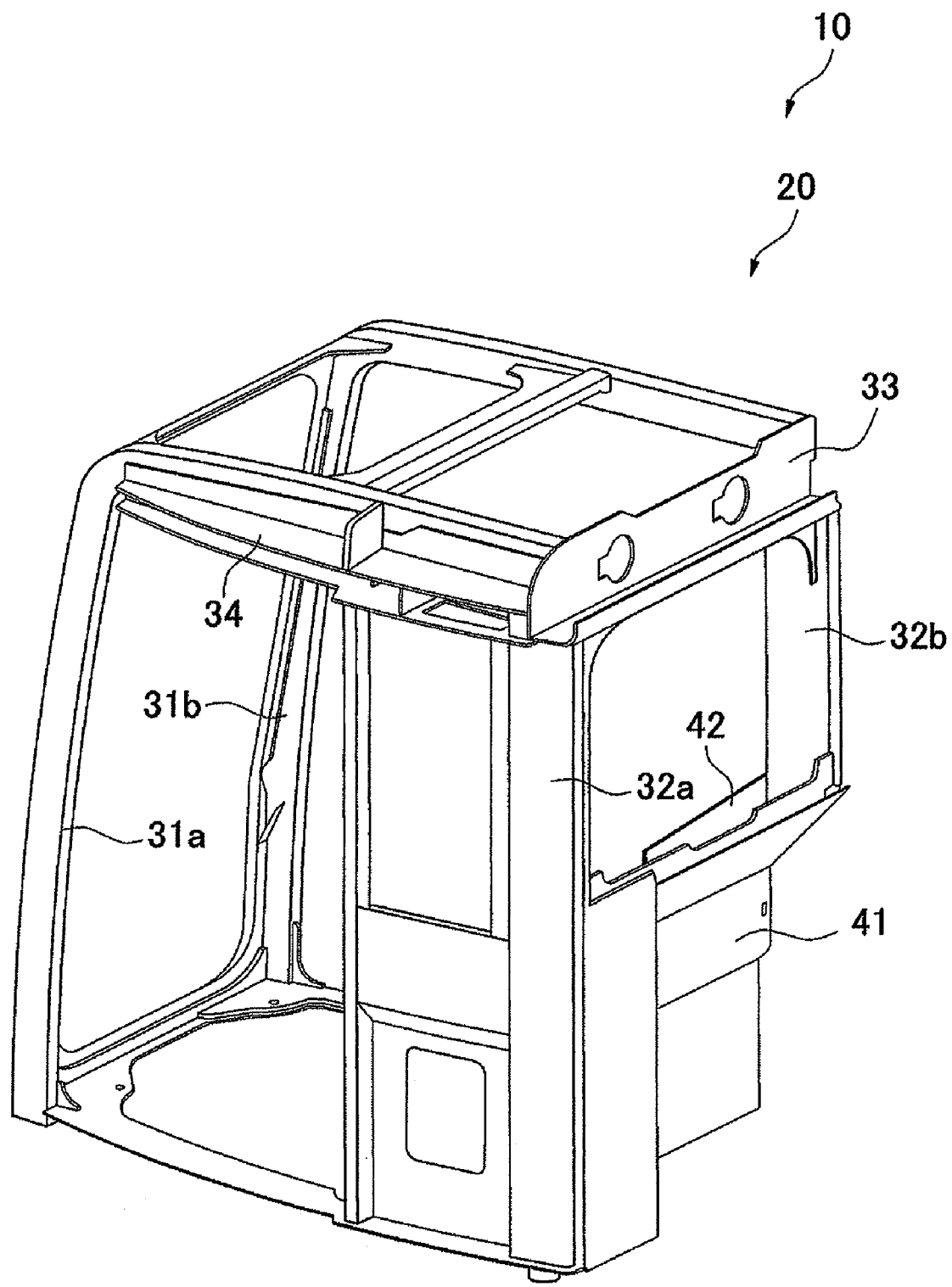
FIG. 10 is a perspective view showing the configuration of the rear side of the cab shown in FIG. 3.
Figure 11:
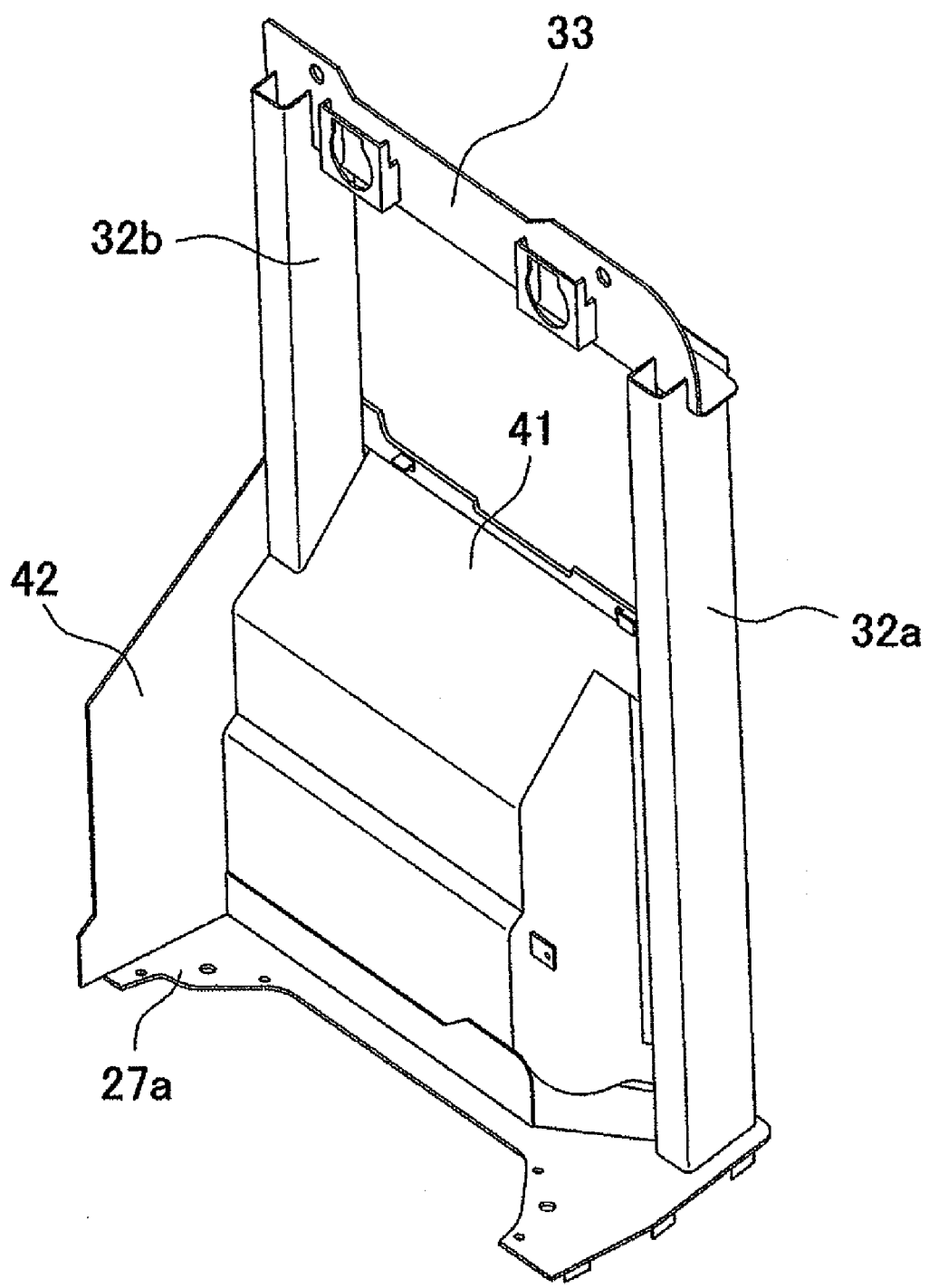
FIG. 11 is a perspective view showing the configuration of members that are mounted to the rear portion of the cab shown in FIG. 3.
Figure 12:
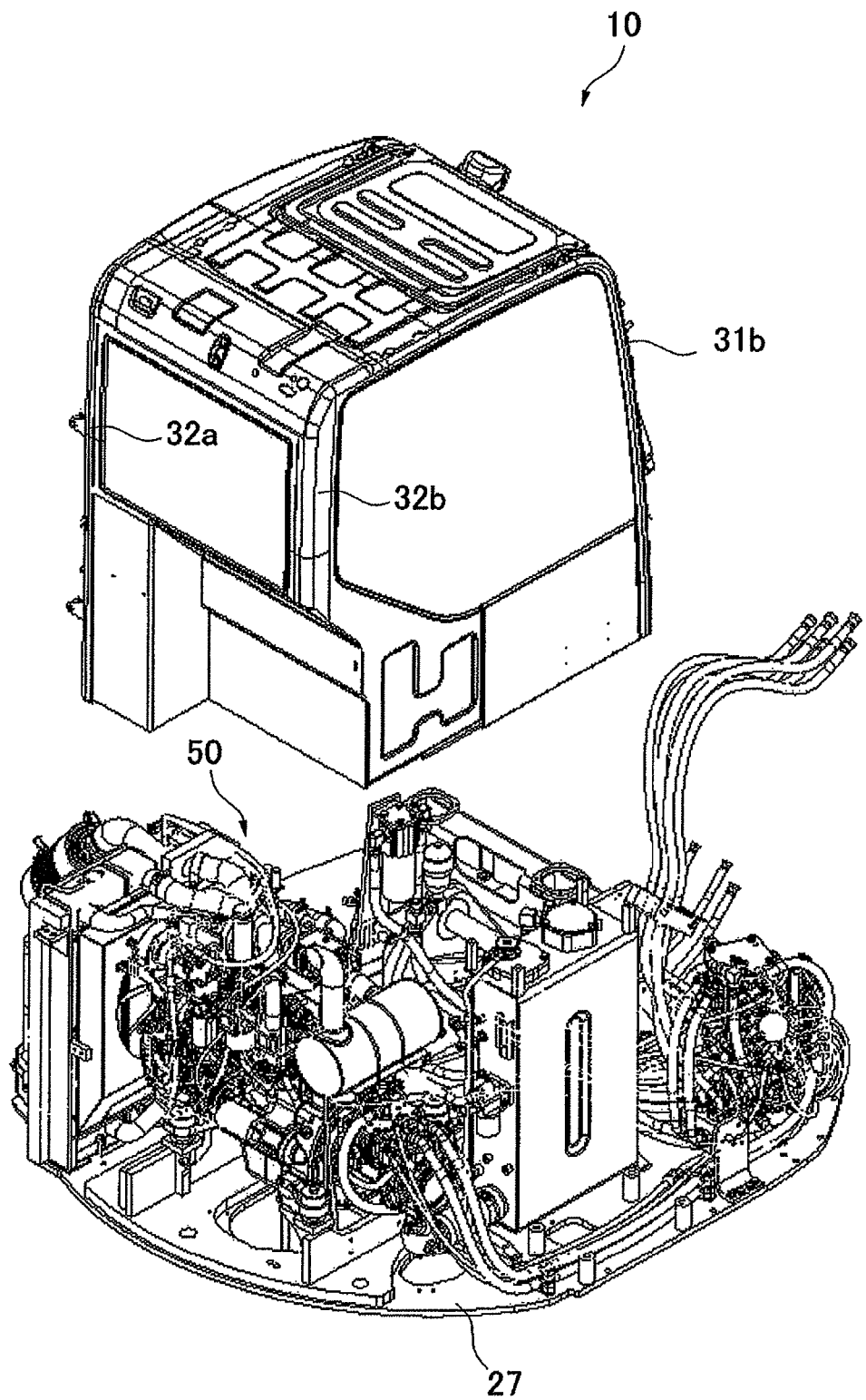
FIG. 12 is a perspective view showing the installation of the cab shown in FIG. 3 onto the revolving unit.
Figure 13:
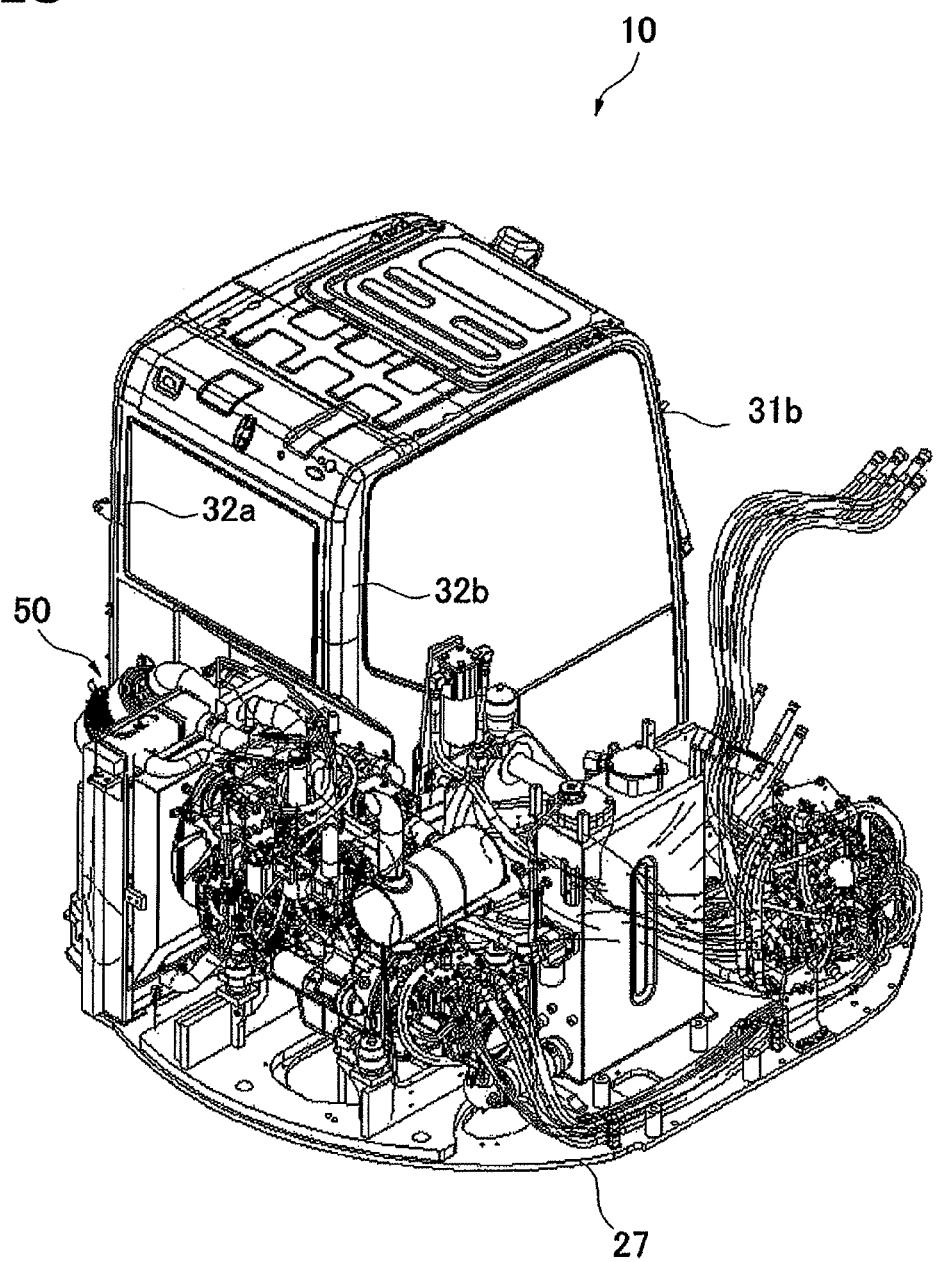
FIG. 13 is a perspective view showing the state of the cab shown in FIG. 3 that is installed on the revolving unit.

As shown in FIGS. 6, 9 and 10, the side beam member 34 is composed of two substantially L-shaped sheet metal members that are combined with each other, and is mounted along the front-left pole member 31a (the beam portion 31ab) on the left side surface side of the cab 10 including the aforementioned arc part. The side beam member 34 couples the beam portion 31ab of the front-left pole member 31a and the rear-left pole member 32a to each other, and is supported on the upper end of the support pole member 35. Accordingly, the rear end of the beam portion 31ab of the front-left pole member 31a and the upper end of the rear-left pole member 32a that are arranged at different phase from each other can be firmly joined to each other by means of the side beam member 34 together with the rear beam member 33. In addition, the side beam member 34 is arranged along and above a range where the slide door 7 slides, and a guide and a roller moving part are arranged on the lower surface of the upper substantially L-shaped sheet metal member and on the upper surface of the lower substantially L-shaped sheet metal member, respectively.

The support pole member 35 is substantially arranged along the vertical direction at the middle part between the pole portion 31aa of the front-left pole member 31a and the rear-left pole member 32a on the left side surface including the arc part where the slide door 7 is attached. Therefore, the support pole member 35 can improve the rigidity of the cab 10 as a whole, and additionally can keep the balance of the cab 10 together with the aforementioned side beam member 34 even when the slide door 7 that is attached to the left side surface of the cab 10 slides.

Features of Cab Structure Unit 20 of Hydraulic Excavator 1

(1) As shown in FIG. 1, the hydraulic excavator 1 according to this embodiment is a so-called small rear-swing radius type hydraulic excavator that includes the revolving unit 3 that is revolvably mounted on the lower traveling unit 2. In addition to this, the cab 10 is arranged on the revolving unit 3 so that the operator steps into/off the cab 10. Also, in the cab 10, as shown in FIG. 3, the cab structure unit 20 is composed of the front-left and front-right pole members 31a and 31b, the rear-left and rear-right pole members 32a and 32b, and the like. The front-left and front-right pole members 31a and 31b are composed of a pipe member that is bent in a substantially L shape. The rear-left and rear-right pole members 32a and 32b are composed of a straight pipe member. Also, the rear end of the beam portion 31ab of the front-left pole member 31a and the upper end of the rear-left pole member 32a that are arranged on the left side surface side of the cab 10 that includes the arc part that is formed along the revolution circle of the revolving unit 3 are arranged at different phase from each other, as shown in FIGS. 8 and 9. In addition, the rear end of the beam portion 31ab of the front-left pole member 31a and the upper end of the rear-left pole member 32a that are arranged at the different phase from each other are coupled to each other by the rear beam member 33.

Thus, on the side that includes the arc part (round shape) that is formed on the left side surface of the small rear-swing radius type hydraulic excavator 1, in the case where the joint parts of the front-left pole member 31a and the rear-left pole member 32a are arranged at different phase from each other, the rear beam member 33 that serves as a beam that couples the upper ends of the rear-left and rear-right pole members 32a and 32b is used to couple the front-left pole member 31a and rear-left pole member 32a, which are composed of a pipe member, to each other without increasing the number of parts. Therefore, since the front-left pole member 31a and the rear-left pole member 32a are composed of a pipe member, as compared with a conventional cab structure that is composed of combined sheet metal members, it is possible to greatly improve the rigidity of the cab 10.

(2) In the cab structure unit 20 of the hydraulic excavator 1 according to this embodiment, since the left side surface of the cab 10 includes the arc part, as shown in FIG. 6, the front-left and front-right pole members 31a and 31b are parallel to each other, and the interval between the front-left and front-right pole members 31a and 31b is narrower than the interval between the rear-left and rear-right pole members 32a and 32b.

Thus, the front-left pole member 31a and the rear-left pole member 32a that are arranged on the left side surface are arranged in the joint part at different phase from each other.

In the cab structure unit 20 according to this embodiment, even in the case where the joint parts of the front-left pole member 31a and the rear-left pole member 32a are thus arranged at different phase from each other, the rear beam member 33 is used to couple the front-left pole member 31a and the rear-left pole member 32a to each other. This coupling between the front-left pole member 31a and the rear-left pole member 32a can provide the cab structure unit 20 with high rigidity without increasing the number of parts.

(3) In the cab structure unit 20 of the hydraulic excavator 1 according to this embodiment, in the arc part that is formed on the left side surface of the cab 10, as shown in FIGS. 3 and 6, the support pole member 35 is arranged at the middle part between the front-left pole member 31a and the rear-left pole member 32a.

Accordingly, even in the case where the slide door 7 is mounted on the left side surface of the cab 10 that includes the arc part so that the operator can step into/off the cab 10 through the slide door 7, the support pole member 35 supports the slide door 7, and thus can maintain the rigidity of the cab 10.

(4) In the hydraulic excavator 1 according to this embodiment, the rear beam member 33 that couples the joint parts of the front-left pole member 31a and the rear-left pole member 32a at different phase from each other is composed of a sheet metal member that is formed in a substantially L shape, as shown in FIGS. 7 and 10.

Accordingly, it is easily form the rear beam member 33 in desired shapes in accordance with the outline of the cab 10. In addition to this, in the case where the rear beam member 33 is composed of a sheet metal member that is formed in a substantially L shape, a part of the beam that composes the cab structure unit 20 can be used as space that accommodates electric wiring and the like.

(5) In the cab structure unit 20 of the hydraulic excavator 1 according to this embodiment, the side beam member 34 is additionally arranged in the upper part of the left side surface of the cab 10 to serve as a member that couples the rear end of the beam portion 31ab of the front-left pole member 31a and the upper end of the rear-left pole member 32a that are arranged at different phase from each other as discussed above.

Accordingly, it is possible to more firmly couple the front-left pole member 31a and the rear-left pole member 32a to each other. In addition to this, although the slide door 7 is mounted on the left side surface of the cab 10 as shown in FIG. 1, and adds its weight on the left side surface of the cab 10, the side beam member 34 is arranged along the upper part of the left side surface of the cab 10 to maintain the high rigidity of the cab 10.

(6) In the cab structure unit 20 of the hydraulic excavator 1 according to this embodiment, as shown in FIGS. 9 and 10, the aforementioned side beam member 34 is composed of a substantially L-shaped sheet metal member.

Accordingly, the side beam member 34 can be easily formed in desired shapes in accordance with the outline of the cab 10 as compared with the case where a pipe member is used for the side beam member. In addition to this, in the case where electric wiring or the like is accommodated in the valley of the substantially L-shaped sheet metal member, it is possible to save space in the cab 10.

(7) In the cab structure unit 20 of the hydraulic excavator 1 according to this embodiment, the slide door 7 is arranged on the left side surface that includes the arc part of the cab 10 so that the operator can step into/off the cab 10 through the slide door 7.

Since the slide door 7 is thus mounted to the arc part that that is formed along a revolution circle in revolving operation to bulge outward, even in opening and closing of the slide door 7, it is possible to prevent the door from protruding outward of the revolving unit 3. Also, the left side surface of the cab 10 that includes the arc part is located in the outermost part of the revolving unit 3. For this reason, the slide door 7 is mounted in the location where the operator can easily step into/off the cab 10.

(8) In the cab structure unit 20 of the hydraulic excavator 1 according to this embodiment, the front-left pole member 31a that composes the cab structure unit 20 is composed of a pipe member that has a rectangular shape in section, and the front-right pole member 31b is composed of a pipe member that has a deformed shape in section.

Accordingly, since a slot or the like that receives the window glass or the like can be formed in the sectionally deformed part, it is not necessary to use an additional member or to conduct machining to receive the window glass. Therefore, it is possible to reduce the number of parts, and to provide a cab structure 20 with good accommodation.

Other Embodiments

The foregoing description has described one embodiment according to the present invention. However, the present invention is not limited to the foregoing embodiment. Various changes and modifications can be made without departing from the spirit of the present invention.

(A) In the foregoing embodiment, the rear end of the beam portion 31ab of the front-left pole member 31a and the upper end of the rear-left pole member 32a that are arranged at positions of different phase from each other (deviated positions from each other) has been illustratively described to be coupled by the rear beam member 33 and the side beam member 34. However, the present invention is not limited to this.

For example, the rear end of the beam portion 31ab of the front-left pole member 31a and the upper end of the rear-left pole member 32a that are arranged at positions of different phase from each other (deviated positions from each other) may be coupled only by the rear beam member 33. In this case, it is also possible to provide an effect that improves the rigidity of the cab without increase in the number of parts similarly to the foregoing embodiment.

However, in the case where the left side surface of the cab is required to have higher rigidity, such as in the case where a slide door or a hinged door is mounted on the left side surface of the cab, from the viewpoint of maintaining the rigidity of the cab at high level, it is preferable that the side beam member 34 is also used as a joint member similarly to the foregoing embodiment.

(B) In the foregoing embodiment, the rear end of the beam portion 31ab of the front-left pole member 31a and the upper end of the rear-left pole member 32a are illustratively described to be arranged at positions of different phase from each other (deviated positions from each other) resulting from difference between the front-side and rear-side intervals (widths) d1 and d2 in the cab 10. However, the present invention is not limited to this.

For example, the cab structure unit 20 may be composed of the rear end of the beam portion 31ab of the front-left pole member 31a and the upper end of the rear-left pole member 32a that are arranged at positions of different phase from each other (deviated positions from each other) resulting not from difference between widths in the cab 10 but from other reasons.

(C) In the foregoing embodiment, the arc part has been illustratively described to be formed on the left side surface of the cab 10. However, the present invention is not limited to this.

For example, in the case where the cab 10 is arranged in the front-right of the revolving unit 3, the round shape (arc part) may be formed on the right side surface of the cab to provide a small rear-swing radius type hydraulic excavator. In this case, the rear beam member that couples the pole members on the side that includes the aforementioned arc part also can provide effects similar to the foregoing embodiment.

(D) In the foregoing embodiment, a sheet metal member that is formed in substantially L shape has been illustratively described to be used as the rear beam member 33 and the side beam member 33 that couple the rear end of the beam portion 31ab of the front-left pole member 31a and the upper end of the rear-left pole member 32a that are arranged at positions of different phase from each other (deviated positions from each other). However, the present invention is not limited to this.

For example, instead of a sheet metal member, the rear beam member 33 may be composed of a pipe member similarly to the front-left and front-right pole members 31a and 31b, and the rear-left and rear-right pole members 32a and 32b to provide a the cab structure unit 20 with further improved rigidity.

However, in the case where sheet metal member is used as in the foregoing embodiment, it is easy to provide formation in accordance with the outline of the cab 10, and additionally to provide space that accommodates electric wiring and the like. From this viewpoint, a sheet metal member is preferably used similarly to the foregoing embodiment.

Furthermore, the shapes of the rear beam member 33 and the side beam member 34 are not limited to a substantially L shape. The rear beam member 33 and the side beam member 34 can have other shapes such as a U shape.

(E) In the foregoing embodiment, the slide door 7 has been illustratively described to be mounted on the left side surface of the cab 10. However, the present invention is not limited to this.

For example, a hinged door may be mounted on the left side surface of the cab 10 instead of the slide door 7. In this case, the hinged door can be supported by the support pole member 35 or the like that is arranged between the front-left pole member 31a and the rear-left pole member 32a.

(F) In the foregoing embodiment, the floor frame 27a that is positioned under the cab structure unit 20 has been described as a separate member from the floor panel 27. However, the present invention is not limited to this.

For example, the floor frame 27a may be formed integrally with the floor panel 27. That is, the front-left and front-right pole members 31a and 31b, and the rear-left pole member 32b may be connected directly to the floor panel 27.

Also, the cab structure unit 20 may be installed on the revolving unit 3 without the vibration isolators 24a.

(G) In the foregoing embodiment, the hydraulic excavator 1 has been illustratively described as a construction machine to which the cab structure according to one embodiment of the present invention is adopted. However, the present invention is not limited to this.

For example, the present invention can be similarly applied to another type of construction machine that includes a revolving unit that is provided with a cab.

In a cab structure in a small rear-swing radius type construction machine that has a protrusion length of a revolving unit from a lower traveling unit in revolving operation not more than a predetermined ratio of the revolving radius R of the revolving unit in plan view, a cab structure for a construction machine according to the present invention provides an effect that largely improves the rigidity of a cab as compared with conventional cabs, and can be widely applied to operator compartments of working machines such as construction machines and agricultural machines.

The invention claimed is:

1. A cab structure for a construction machine that is fixedly arranged on a revolving unit that is revolvably mounted on a lower traveling unit, and includes an arc part that is formed along a revolution circle on one side surface of a cab not to extend outside of a predetermined revolving radius, wherein the cab structure comprising:
    first pole members that extend from a front-right end to a rear-right end of the cab, and from a front-left end to a rear-left end of the cab, each of the first pole members including a pipe member that is bent in a substantially L shape, the pipe member including a pole portion that is substantially arranged along a vertical direction and a beam portion that is substantially arranged along a horizontal direction;
    second pole members that are substantially arranged along the vertical direction at the rear-right end and the rear-left end of the cab, wherein each of the second pole members includes a substantially straight pipe member, and an upper end of one of the second pole members that is arranged at a rear end of the one side surface on a side that includes said arc part is deviated from a plane that is defined by one of said first pole members on the side that includes said arc part, the second pole members and the pole portions of the first pole members being respectively disposed at four corners of a substantially box-shaped cab formed by the cab structure; and
    a first joint member disposed at a rear end part of the cab structure, and coupling the upper ends of said second pole members to each other, and coupling a rear end of said beam portion of the one of said first pole members and the upper end of the one of said second pole members to each other, the first joint member being a sheet metal member that has a substantially L shape in cross-section.

2. The cab structure for a construction machine set forth in claim 1, wherein
    said first pole members are arranged in parallel to each other, wherein an interval between said first pole members that are arranged at said front-left end and said front-right end differs from an interval between said second pole members that are arranged at said rear-left end and said rear-right end.

3. The cab structure for a construction machine set forth in claim 1, further comprising
    a second joint member that couples the pole portion of the one of said first pole members and the one of said second pole members on the side that includes said arc part, and said first joint member to each other.

4. The cab structure for a construction machine set forth in claim 3, wherein
    said second joint member is a sheet metal member that has a substantially L shape in section.

5. The cab structure for a construction machine set forth in claim 3, further comprising
    a third pole member that is substantially arranged along the vertical direction, and an upper end of the third pole member is joined to said second joint member at a position between the pole portion of the one of said first pole members and the one of said second pole members on the side that includes said arc part.

6. The cab structure for a construction machine set forth in claim 1, wherein
    a stepping into/off slide door is mounted on the one side surface on the side that includes said arc part.

7. The cab structure for a construction machine set forth in claim 1, wherein
    at least one of said pipe members includes a steel pipe member with a deformed shape in section.

8. A cab structure for a construction machine that is fixedly arranged on a revolving unit that is revolvably mounted on a lower traveling unit, and includes an arc part that is formed along a revolution circle on one side surface of a cab not to extend outside of a predetermined revolving radius, wherein the cab structure comprising:
    first pole members that extend from a front-right end to a rear-right end of the cab, and from a front-left end to a rear-left end of the cab, each of the first pole members including a pipe member that is bent in a substantially L shape, the pipe member including a pole portion that is substantially arranged along a vertical direction and a beam portion that is substantially arranged along a horizontal direction;
    second pole members that are substantially arranged along the vertical direction at the rear-right end and the rear-left end of the cab, wherein each of the second pole members includes a substantially straight pipe member, and an upper end of one of the second pole members that is arranged at a rear end of the one side surface on a side that includes said arc part is arranged at a different phase from the beam portion of one of said first pole members on the side that includes said arc part, the second pole members and the pole portions of the first pole members being respectively disposed at four corners of a substantially box-shaped cab formed by the cab structure; and
    a first joint member disposed at a rear end part of the cab structure, and coupling the upper ends of said second pole members, and coupling a rear end of said the beam portion of the one of said first pole members and the upper end of the one of said second pole members that is arranged at the different phase from the beam portion of the one of said first pole members, the first joint member being a sheet metal member that has a substantially L shape in cross-section.

* * * * *